United States Patent Office 3,127,438
Patented Mar. 31, 1964

3,127,438
ESTER PRODUCTION FROM ISOPARAFFIN
AND CARBON MONOXIDE
Bernard S. Friedman, Chicago, and Sherwood M. Cotton, Harvey, Ill., assignors, by mesne assignments, to Sinclair Research, Inc., New York, N.Y., a corporation of Delaware
No Drawing. Filed Apr. 6, 1959, Ser. No. 804,091
14 Claims. (Cl. 260—468)

This invention is concerned with the carbonylation of certain saturated hydrocarbons; that is, the conversion of these hydrocarbons to esters. The conversion process includes reaction of the hydrocarbon with CO in the presence of a catalyst and an alkylating agent such as an olefin or alkyl halide, with subsequent contacting of the reaction products with alcohol to produce esters containing acyl radicals derived from both the starting saturated hydrocarbon and alkylating agent. The process of this invention converts, for example, propylene or propyl chloride to an isobutyrate; t-butyl chloride, isobutane or isobutylene to a pivalate; propylene tetramer or isododecane to a $C_{13}$ ester; nonylene dimer or isooctodecane to a $C_{19}$ ester, etc.

The process is effective to convert isoparaffins from $C_4$ upwards, olefins from ethylene or propylene upwards and halides from propyl halide upwards to esters having one more carbon atom in the acyl group than the starting paraffin and alkylating agent. The term "isoparaffin" includes paraffins and cycloparaffins which are characterized by the presence of a carbon atom to which three other carbon atoms and one hydrogen are attached. This configuration exists in alkyl substituted cycloparaffins such as ethyl-cyclohexane and α- or β-methyl decalin. Where the only tertiary hydrogens in the saturated hydrocarbon are attached to carbon atoms shared by two rings of a saturated fused ring system, it must be in the cis-form for conversion to the ester. Trans-decalin, therefore, must be isomerized to cis-decalin for use in this process, for example, by treatment with an isomerization catalyst such as $AlCl_3$ or an $HF/BF_3$ mixture. The iso-paraffin may vary in carbon content from 4 to 50 carbon atoms or more, the process thereby being operable even on paraffin waxes which have an iso-, i.e., tertiary, hydrogen. The isoparaffin frequently contains up to 12 or 18 carbon atoms and may be substituted with non-interfering functional groups which may include even aromatic substituents which are prevented from further alkylation by steric hindrance factors, e.g. p-cymene. Since the process takes place in the liquid phase it is only effective on those hydrocarbons which are liquid, or can be made liquid by condensation, melting or solution.

The alkylating agent may be an olefin or alkyl halide of 2–32 carbon atoms with a straight or branched chain. Ethylene is operable only under special conditions and olefins and alkyl halides with a carbon content of 3 to 18 atoms per molecule are preferred. The paraffin and the alkylating agent can be chosen so that the ester products are readily separable, for example, by distillation, or may be selected to give the same product. Since the lower-boiling olefins and alkyl halides, especially the chlorides, are more readily available, such alkylating agents as propylene, butylene, their dimers and chlorides are generally selected to react with higher-boiling isoparaffins.

Anhydrous HF is used to catalyze the reaction with CO. It is important to avoid the presence of water in order to get maximum yields. The alcohol, which is to supply the alkyl part of the ester to be produced, may be present during the carbonylation reaction up to about 5% by weight of the HF, but more than this quantity may lessen the catalytic activity of the HF. The alcohol is monohydric or polyhydric and may be aliphatic or aromatic or combine both structures. Straight or branched-chain primary alcohols are operable. Secondary alcohols also may be used provided that they do not have any branching at the alpha carbon or otherwise produce tertiary carbonium ions. The alcohols may contain one or more carbon atoms, a practical upper limit again being about 32 carbon atoms. Methanol is preferred when the ester produced is to be used in a transesterification process or other process where it is an intermediate.

The alkylating agent and paraffin are present in the carbonylation reaction preferably in the proportion of from about 1 mole olefin or halide/1 mole paraffin to about 1 mole olefin or halide/20 moles paraffin, preferably about 1/5–10. The mole ratio of catalyst to olefin or halide is about 2/1 to 20/1, preferably about 2/1 to 10/1. The reaction with carbon monoxide is conducted at about 0° to 200° F. A temperature range of about 50–150° F. is usually most effective and room temperature is preferred. The reaction is conducted under a partial pressure of carbon monoxide of about 1 atmosphere to about 50 atmospheres. If a countercurrent system is used for contacting the CO with the other reactants, the partial pressure of this gas may measure less than one atmosphere in the exit gas line because this gas is in effect being scrubbed out. It is advisable to operate at moderately high carbon monoxide pressures in order to minimize olefin side reactions such as polymerization and cleavage but those in excess of 50 atmospheres retard the carbonylation of the paraffin. Also, contact between the catalyst and olefin or alkyl halide should be avoided before contact with the CO and paraffin, unless it is desired to polymerize the olefin before reaction. The reaction with alcohol may be performed as soon as the carbon monoxide reaction ceases and the olefin or alkyl halide supply is stopped. The product may then be added to the alcohol at a temperature of about 75–250° F., preferably about 75–150°.

A suggested mode of conducting the reaction is to put the catalyst and paraffin in a bomb or other reaction vessel and pressure this with CO. The CO may be mixed with an inert gas, such as hydrogen, carbon dioxide or methane if desired. The alkylating agent is then added gradually until the reaction ceases, usually in one minute to one hour. This completion is signaled by a halt in the fall of the CO pressure. If an elevated temperature is required to initiate the reaction, it is usually permissible to let the temperature fall gradually during the reaction. After the final reaction with alcohol, the resulting mixture may be passed to a distillation step wherein the catalyst, the product esters and unreacted starting materials may easily be separated from each other. Any excess of paraffin can be recycled to the carbon monoxide contacting step.

The following examples are illustrative of the process of the invention but are not to be construed as limiting its scope.

EXAMPLE I 4.9 moles methylcyclohexane were charged to a reaction with 12.8 moles of HF catalyst. The reactor was pressured with CO to 325 p.s.i.g. Two moles of t-butyl chloride were injected into the reactor with agitation over a period of 16 minutes. After this addition was complete the vessel was agitated for 44 minutes longer, the CO pressure gradually falling to 170 p.s.i.g., where it remained. CO consumption was approximately 1.5 moles. The reaction was conducted at about 67° F. After completion of the carbon monoxide reaction the mixture was agitated with methanol in excess of the stoichiometric amount at 130° F. to give 0.5 mole methyl pivalate, 0.58 mole of the methyl ester of 1-methylcyclohexane carboxylic acid and 0.6 mole isobutane.

EXAMPLE II

The same reaction as Example I was run using 2 moles of propylene, 5.0 moles methylcyclopentane and 15.8 moles HF as the catalyst. The reaction took 54 minutes and on addition of excess methanol at about 120° F. yielded 0.43 mole methyl isobutyrate, 0.24 mole methyl ester of 1-methylcyclohexane carboxylic acid and 0.31 mole isobutane.

Table I reports the results of conducting the process using other saturated hydrocarbons, and using methanol in the final alcohol contacting step in excess of the stoichiometric amount and at temperatures in the range of 100° to 150° F.

*Table 1*

| Example | Saturated hydrocarbon (moles) | Olefin or alkyl halide (moles) | Minutes to add | Minutes additional stirring | Carbon monoxide | | | Moles, HF | Temp., °F. | Methyl ester | |
|---|---|---|---|---|---|---|---|---|---|---|---|
| | | | | | Start, p.s.i.g. | End, p.s.i.g. | Moles consumed | | | Moles from saturate | Moles from olefin or halide |
| III | cis-decalin (4) | t-butyl chloride (2) | 24 | 38 | 270 | 200 | 0.6 | 10.5 | 66 | 0.2 decalin carboxylate | 0.41 pivalate. |
| IV | trans-decalin (3.62) | t-butyl chloride (3.85) | 83 | 52 | 500 | 300 | 2.7 | 10.45 | 80 | none | 2.15 pivalate. |
| V | isobutane (3.6) | propylene (1.07) | 20 | 10 | 870 | 740 | 0.6 | 29.2 | 76 | 0.05 pivalate | 0.54 isobutyrate. |
| VI | 2,3-dimethyl butane (5) | isobutene (2) | 22 | 38 | 180 | 30 | 2.0 | 10.35 | 65 | 0.86 2,2,3-trimethylbutanoate | 0.69 pivalate. |
| VII | methylcyclopentane (5) | propylene (2) | 20 | 34 | 840 | 575 | 1.1 | 15.8 | 89 | 0.24 1-methylcyclopentane carboxylate | 0.43 isobutyrate. |
| VIII | cyclohexane (2.5), n-pentane (2.5) | t-butyl chloride (286 grams) | 17 | 103 | 280 | 175 | 1.5 | 10.75 | 69 | none | 0.5 pivalate. |

As can be seen from Examples IV and VIII, normal paraffins are not susceptible to conversion to an ester by the process of this invention while trans-decalin must first be isomerized to the cis-form. This paraffin, as well as other isoparaffins, may then be converted by this process to esters.

We claim:
1. A method for the production of esters which comprises reacting with carbon monoxide a hydrocarbon selected from cis-decalin, paraffins and cycloparaffins characterized by the presence of a carbon atom to which 3 other carbon atoms and one hydrogen are attached and of 4 to 50 carbon atoms in the presence of about one mole of an agent, for each 1 to 20 moles of selected hydrocarbon, of about 2–32 carbon atoms selected from the group consisting of mono-olefins and alkyl halides and about 2 to 20 moles per mole of agent of a catalyst consisting essentially of substantially anhydrous HF at a temperature of about 10° to 200° F. and a pressure sufficient to maintain the liquid phase, contacting the reaction product with a non-tertiary alkanol of up to 32 carbon atoms and recovering therefrom an ester having an acyl group which contains one more carbon atom than the starting isoparaffin.

2. The method of claim 1 where the said selected hydrocarbon has 4 to 12 carbon atoms and the agent has 3 to 18 carbon atoms.

3. The method of claim 2 where the agent is an alkyl chloride.

4. The method of claim 2 where the alkanol is a monohydric primary aliphatic alcohol.

5. The method of claim 4 where the alcohol is methanol.

6. The method of claim 5 where the said selected hydrocarbon is isobutane.

7. The method of claim 1 where the reaction mixture contains 1 to 10 moles of said selected hydrocarbon for each mole of agent.

8. The method of claim 1 where an ester derived from the agent is also recovered.

9. The method of claim 1 where the said selected hydrocarbon has 4 to 18 carbon atoms.

10. The method of claim 1 where the agent has 3 to 18 carbon atoms.

11. The method of claim 1 where the temperature is about 50°–150° F.

12. A method for the production of esters which comprises reacting with carbon monoxide, having a partial pressure of about 1 to 50 atmospheres, a hydrocarbon selected from cis-decalin, paraffins and cycloparaffins characterized by the presence of a carbon atom to which 3 other carbon atoms and one hydrogen are attached and of 4 to 18 carbon atoms, at a temperature of about 10° to 200° F. and a total pressure sufficient to maintain the liquid phase, in the presence of a catalyst consisting essentially of substantially anhydrous HF and about one mole per 5 to 10 moles of selected hydrocarbon which also is about one mole per 2 to 10 moles of catalyst of an agent of 3 to 18 carbon atoms selected from the group consisting of monoolefins and alkyl chlorides, contacting the reaction product with a non-tertiary alkanol of up to 32 carbon atoms and recovering therefrom an ester having an acyl group which contains one more carbon atom than the starting isoparaffin.

13. The method of claim 12 in which the alkanol is a monohydric primary aliphatic alcohol.

14. The method of claim 13 in which the alcohol is methanol.

References Cited in the file of this patent

UNITED STATES PATENTS

| | | |
|---|---|---|
| 2,135,452 | Loder | Nov. 1, 1938 |
| 2,253,525 | Loder | Aug. 26, 1941 |
| 2,805,245 | Natta et al. | Sept. 3, 1957 |
| 2,874,186 | Friedman | Feb. 17, 1959 |
| 3,005,846 | Friedman et al. | Oct. 24, 1961 |

OTHER REFERENCES

Fieser et al: Organic Chemistry, p. 537, Reinhold, 1956.